(12) United States Patent
Oniwa et al.

(10) Patent No.: US 11,548,443 B2
(45) Date of Patent: Jan. 10, 2023

(54) DISPLAY SYSTEM, DISPLAY METHOD, AND PROGRAM FOR INDICATING A PERIPHERAL SITUATION OF A VEHICLE

(71) Applicant: HONDA MOTOR CO., LTD., Tokyo (JP)

(72) Inventors: Yoshihiro Oniwa, Wako (JP); Fue Kubota, Wako (JP); Hironori Takano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 16/758,875

(22) PCT Filed: Nov. 10, 2017

(86) PCT No.: PCT/JP2017/040567
§ 371 (c)(1),
(2) Date: Apr. 24, 2020

(87) PCT Pub. No.: WO2019/092846
PCT Pub. Date: May 16, 2019

(65) Prior Publication Data
US 2020/0262349 A1   Aug. 20, 2020

(51) Int. Cl.
*B60R 1/00* (2022.01)
*H04N 5/262* (2006.01)
*G06V 20/56* (2022.01)

(52) U.S. Cl.
CPC .............. *B60R 1/00* (2013.01); *G06V 20/56* (2022.01); *H04N 5/2628* (2013.01);
(Continued)

(58) Field of Classification Search
CPC .................. B60R 1/00; B60R 2300/10; B60R 2300/20; B60R 2300/30; G06V 20/56; H04N 5/2628
See application file for complete search history.

(56) References Cited

U.S. PATENT DOCUMENTS

2004/0189831 A1* 9/2004 Shibatani ........... H04N 5/23299
348/240.99
2009/0073263 A1 3/2009 Harada et al.
(Continued)

FOREIGN PATENT DOCUMENTS

| CN | 103987582 | 8/2014 |
|---|---|---|
| CN | 105946720 | 9/2016 |

(Continued)

OTHER PUBLICATIONS

International Search Report and Written Opinion for International Application No. PCT/JP2017/040567 dated Feb. 6, 2018, 10 pages.
(Continued)

*Primary Examiner* — Terrell M Robinson
(74) *Attorney, Agent, or Firm* — Amin, Turocy & Watson, LLP

(57) ABSTRACT

A display system includes a display (400) configured to display an image, and a display controller (120) configured to control the display such that a periphery image indicating a peripheral situation of a vehicle viewed from a predetermined virtual viewpoint is displayed in a predetermined display region on a display surface, and change the predetermined display region on the basis of a traveling state of the vehicle.

8 Claims, 8 Drawing Sheets

(52) U.S. Cl.
CPC ....... *B60R 2300/10* (2013.01); *B60R 2300/20* (2013.01); *B60R 2300/30* (2013.01)

(56) References Cited

U.S. PATENT DOCUMENTS

| | | | |
|---|---|---|---|
| 2012/0169875 A1 | 7/2012 | Matsukawa et al. | |
| 2013/0010117 A1* | 1/2013 | Miyoshi | G06F 3/0412 348/148 |
| 2015/0084755 A1* | 3/2015 | Chen | G08G 1/16 340/435 |
| 2016/0375831 A1* | 12/2016 | Wang | B62D 15/0295 348/148 |
| 2018/0229657 A1* | 8/2018 | Yamamoto | H04N 5/44504 |
| 2018/0281681 A1* | 10/2018 | Sunohara | H04N 7/18 |
| 2018/0373343 A1* | 12/2018 | Hashimoto | G06F 3/02 |

FOREIGN PATENT DOCUMENTS

| | | | |
|---|---|---|---|
| CN | 106043306 | | 10/2016 |
| CN | 107298050 | | 10/2017 |
| JP | 2009-071790 | | 4/2009 |
| JP | 2012-140106 | | 7/2012 |
| JP | 2015-023484 | | 2/2015 |
| JP | 2015023484 A | * | 2/2015 |
| JP | 2015-201775 | | 11/2015 |
| JP | 2017-069852 | | 4/2017 |
| JP | 2017-166913 | | 9/2017 |
| JP | 2017166913 A | * | 9/2017 |

OTHER PUBLICATIONS

Chinese Office Action for Chinese Patent Application No. 201780096251.6 dated Dec. 22, 2020.

* cited by examiner

DISPLAY SYSTEM, DISPLAY METHOD, AND PROGRAM FOR INDICATING A PERIPHERAL SITUATION OF A VEHICLE

TECHNICAL FIELD

The present invention relates to a display system, a display method, and a program.

BACKGROUND ART

In the related art, there is a technique in which an image captured by imaging means provided in an own vehicle is converted into an image viewed from a virtual viewpoint that is changed in relation to another vehicle, and is displayed on a display (refer to Patent Literature 1).

CITATION LIST

Patent Literature

[Patent Literature 1] Japanese Unexamined Patent Application, First Publication No. 2017-69852

SUMMARY OF INVENTION

Technical Problem

However, a situation desired to be checked in the periphery of an own vehicle differs depending on a state of the own vehicle. Therefore, in a case where a virtual viewpoint is changed in relation to other vehicles, appropriate display of the vehicle periphery based on a state of the own vehicle may not be performed.

The present invention has been made in consideration of the circumstances, and an object thereof is to provide a display system, a display method, and a program capable of appropriately displaying an image of a vehicle periphery on the basis of a state of a vehicle.

Solution to Problem (1): There is provided a display system including a processor; a memory storing program instructions executable by the processor to: display an image; and control a display such that a periphery image indicating a peripheral situation of a vehicle viewed from a predetermined virtual viewpoint is displayed in a predetermined display region on a display surface, and change the predetermined display region on the basis of a traveling state of the vehicle.

(2): In (1), changing the predetermined display comprises increasing the predetermined display region in a case where a speed of the vehicle is equal to or higher than a predetermined speed compared with a case where the speed of the vehicle is lower than the predetermined speed.

(3): In (2), changing the predetermined display comprises fixing the predetermined display region regardless of the speed of the vehicle in a case where the speed of the vehicle is lower than the predetermined speed.

(4): In (1) to (3), the program instructions are further executable by the processor to: recognize an object present in the periphery of the vehicle, and controlling the display comprises displaying an image of an object recognized in the predetermined display region.

(5): In (1) to (4), the program instructions are further executable by the processor to: execute driving assistance of the vehicle to a plurality of different degrees, and changing the predetermined display comprises determining a viewpoint position of the virtual viewpoint, an angle of view from the virtual viewpoint, or an imaging direction from the virtual viewpoint on the basis of an environment of a road on which the vehicle is traveling and the degree of driving assistance controlled, and changes the predetermined display region on the basis of the determined viewpoint position, angle of view, or imaging direction.

(6): In (1) to (5), changing the predetermined display comprises changing a shape of a road on which the vehicle is traveling and lane markings partitioning the road, the shape of the road and the lane markings being displayed in the predetermined display region, on the basis of the traveling state of the vehicle.

(7): In (1) to (6), changing the predetermined display comprises displaying a rear region and a front region of the vehicle in the predetermined display region, and changes a display region related to the front region in the predetermined display region on the basis of the traveling state of the vehicle.

(8): In (1) to (7), changing the predetermined display comprises changing a position of an upper end of the predetermined display region on the basis of the traveling state of the vehicle.

(9): There is provided a display method of causing a computer to control a display such that a periphery image indicating a peripheral situation of a vehicle viewed from a predetermined virtual viewpoint is displayed in a predetermined display region on a display surface; and change the predetermined display region on the basis of a traveling state of the vehicle.

(10): There is provided a non-transitory computer-readable storage medium that stores a program to be executed by a computer to perform at least: to control a display such that a periphery image indicating a peripheral situation of a vehicle viewed from a predetermined virtual viewpoint is displayed in a predetermined display region on a display surface; and change the predetermined display region on the basis of a traveling state of the vehicle.

Advantageous Effects of Invention

According to (1) to (10), it is possible to appropriately display an image of a vehicle periphery on the basis of a state of a vehicle.

DESCRIPTION OF EMBODIMENTS

Hereinafter, with reference to the drawings, a display system, a display method, and a program according to an embodiment of the present invention will be described. In the embodiment, as an example, a description will be made of a case where a display system displays a result of recognizing the periphery of a vehicle when the vehicle performs automated driving. The automated driving indicates that one or both of steering control or speed control are performed such that a vehicle travels without depending on an operation of an occupant, and is a kind of driving assistance. In the embodiment, it is assumed that the driving assistance has a first degree to which the driving assistance is executed as a result of a driving assistance apparatus such as an adaptive cruise control system (ACC) or a lane keeping assistance system (LKAS) operating, a second degree which is higher than the first degree in terms of a degree of control and in which automated driving is executed by autonomously controlling at least one of acceleration or deceleration, or steering of a vehicle without an occupant performing an operation on a driving operator of the vehicle, but some extent of periphery monitoring duty is imposed on the occupant, and a third degree which is higher than the second degree in terms of a degree of control and in which a periphery monitoring duty is not imposed on an occupant (or a periphery monitoring duty lower than that in the second degree is imposed). In the present embodiment, driving assistance in the second degree or the third degree is assumed to correspond to automated driving. The "occupant" in the embodiment is, for example, an occupant sitting on a driver seat, that is, a seat around which driving operators are provided.

[Overall Configuration]

Figure 1:
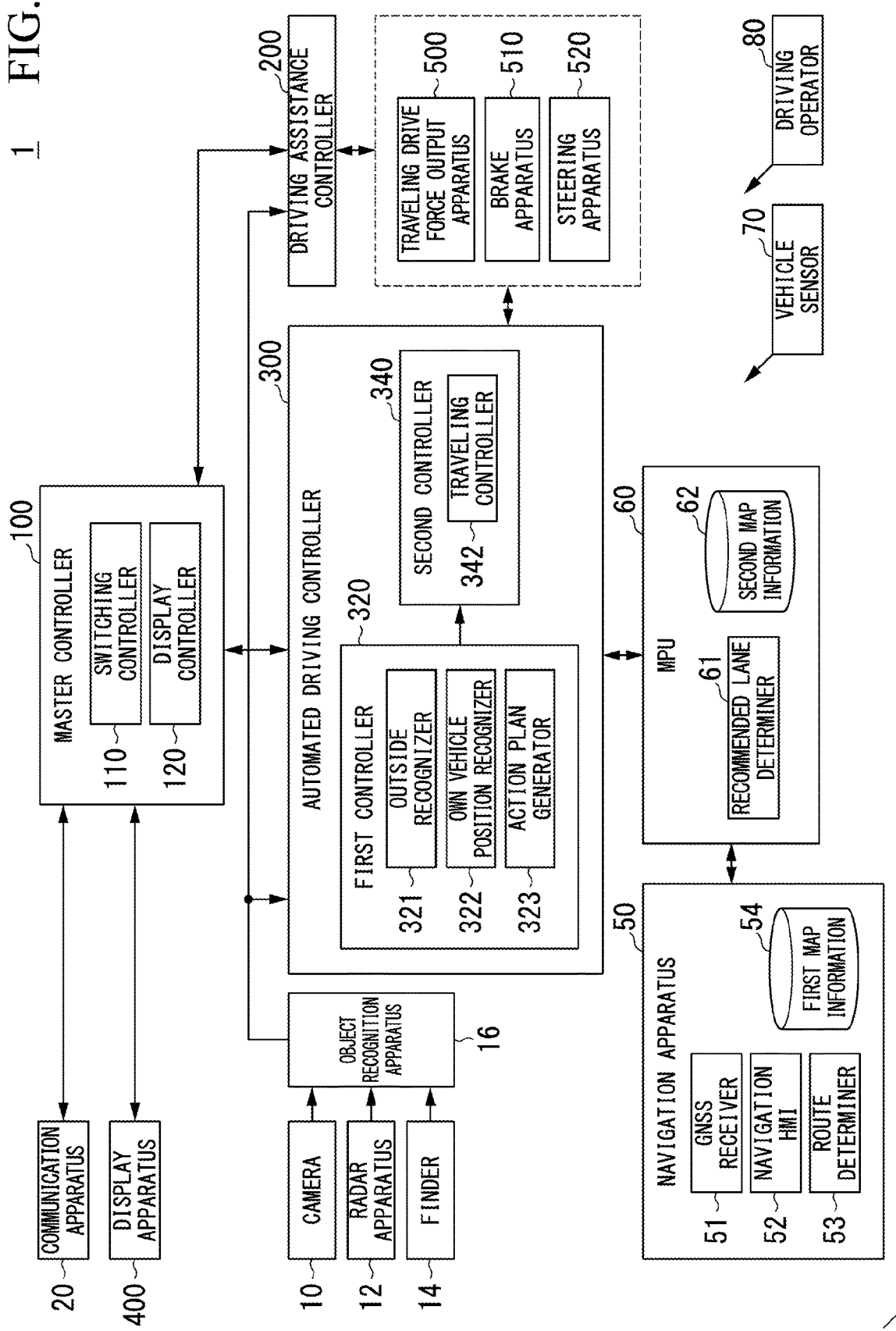
FIG. 1 is a diagram illustrating a configuration of a vehicle system 1 including a display system of an embodiment.

FIG. 1 is a diagram illustrating a configuration of a vehicle system 1 including a display system of the embodiment. A vehicle (hereinafter, referred to as an own vehicle M) in which the vehicle system 1 is mounted is a vehicle such as a two-wheeled vehicle, a three-wheeled vehicle, or a four-wheeled vehicle, and a drive source thereof is an internal combustion engine such as a diesel engine or a gasoline engine, a motor, or a combination thereof. The motor operates by using electric power generated by a generator connected to an internal combustion engine or electric power released from a secondary battery or a fuel cell.

In FIG. 1, the vehicle system 1 includes, for example, a camera 10, a radar apparatus 12, a finder 14, an object recognition apparatus 16, a communication apparatus 20, a navigation apparatus 50, a map positioning unit (MPU) 60, a vehicle sensor 70, a driving operator 80, a master controller 100, a driving assistance controller 200, an automated driving controller 300, a display apparatus (an example of a display) 400, a traveling drive force output apparatus 500, a brake apparatus 510, and a steering apparatus 520. The apparatuses and the equipment are connected to each other via a multiple communication line such as a controller area network (CAN) communication line, a serial communication line, or a wireless communication network. The configuration of the vehicle system 1 illustrated in FIG. 1 is only an example, and some of the constituent elements may be omitted, and other constituent elements may be added. A combination of the display apparatus 400 and the display controller 120 is an example of a "display system". A combination of the object recognition apparatus 16 and an outside recognizer 321 is an example of an "object recognizer". A combination of the driving assistance controller 200 and the automated driving controller 300 is an example of a "driving controller".

The camera 10 images the periphery of the own vehicle M, and thus generates a captured image. The camera 10 is a digital camera using a solid-state imaging element such as a charge coupled device (CCD) or a complementary metal oxide semiconductor (CMOS). The camera 10 is attached at any location in the own vehicle M in which the vehicle system 1 is mounted. The periphery of the own vehicle includes a front side of the own vehicle, and may include a lateral side or a rear side of the own vehicle. In a case where the front side is imaged, the camera 10 is attached to the upper part of a front windshield, the back surface of an interior mirror, or the like. In a case where the rear side is imaged, the camera 10 is attached to the upper part of a rear windshield, a back door, or the like. In a case where the lateral side is imaged, the camera 10 is attached to a side-view mirror or the like. For example, the camera 10 periodically repeatedly images the periphery of the own vehicle M. The camera 10 may be a stereo camera.

The radar apparatus 12 radiates electric waves such as millimeter waves in a predetermined irradiation direction in the periphery of the own vehicle M, detects electric waves (reflected waves) reflected by an object, and thus detects at least a position (a distance and an azimuth) of the object. The object is, for example, other vehicles, obstacles, or a structure near the own vehicle. The radar apparatus 12 is attached alone or in a plurality at any locations in the own vehicle M. The radar apparatus 12 may detect a position and a speed of an object according to a frequency modulated continuous wave (FMCW) method.

The finder 14 is light detection and ranging or laser imaging detection and ranging (LIDAR) for detecting a distance to an object by measuring scattered light of irradiation light that is applied in a predetermined irradiation direction in the periphery of the own vehicle M. The finder 14 is attached alone or in a plurality at any locations in the own vehicle M.

The object recognition apparatus 16 performs a sensor fusion process on detection results from some or all of the camera 10, the radar apparatus 12, and the finder 14, and thus recognizes a position, a type, a speed, and the like of an object present in the periphery of the own vehicle. In a case where an object is another vehicle, the object recognition apparatus 16 outputs a recognition result to the driving assistance controller 200 and the automated driving controller 300.

The communication apparatus 20 performs communication with, for example, another vehicle present in the periphery of the own vehicle M, or performs communication with various server apparatus via a wireless base station. The communication apparatus 20 may acquire a vehicle type of another vehicle, a traveling state (a vehicle speed, acceleration, or a traveling lane) of another vehicle, and the like through communication with another vehicle present in the periphery of the own vehicle M.

The navigation apparatus 50 includes, for example, a global navigation satellite system (GNSS) receiver 51, a navigation human machine interface (HMI) 52, and a route determiner 53, and stores first map information 54 in a storage device such as a hard disk drive (HDD) or a flash memory. The GNSS receiver 51 identifies a position of the own vehicle M on the basis of a signal received from a GNSS satellite. The navigation HMI 52 includes a display device, a speaker, a touch panel, keys, and the like. The navigation HMI 52 may be partially or entirely integrated into the display apparatus 400 which will be described later. The route determiner 53 determines, for example, a route (for example, including information regarding a via-point during traveling to a destination) from a position of the own vehicle M identified by the GNSS receiver 51 (or any entered position) to the destination that is entered by an occupant by using the navigation HMI 52 on the basis of the first map information 54. The first map information 54 is, for example, information in which a road shape is expressed by a link indicating a road and nodes connected to each other via the link. The first map information 54 may include a curvature of a road, point of interest (POI) information, and the like. The route determined by the route determiner 53 is output to the MPU 60. The navigation apparatus 50 may perform route guidance using the navigation HMI 52 on the basis of the route determined by the route determiner 53.

The MPU 60 functions as, for example, a recommended lane determiner 61, and stores second map information 62 in a storage device such as an HDD or a flash memory. The recommended lane determiner 61 determines a recommended lane for each block on a route provided from the navigation apparatus 50 by referring to the second map information 62.

The second map information 62 is map information with a higher accuracy than that of the first map information 54. The second map information 62 has, for example, lane center information, lane boundary information, road information, traffic regulation information, address information, facility information, and telephone number information. The second map information 62 may include information regarding a section in which a lane change is possible or a section in which overtaking is possible.

The vehicle sensor 70 includes, for example, a vehicle speed sensor detecting a speed of the own vehicle M, an acceleration sensor detecting acceleration, a yaw rate sensor detecting an angular speed about a vertical axis, and an azimuth sensor detecting an orientation of the own vehicle M, and detects a traveling state of the own vehicle.

The operation unit 80 includes, for example, an accelerator pedal, a brake pedal, a shift lever, and a steering wheel.

[Master Controller]

The master controller 100 includes, for example, a switching controller 110 and a display controller 120. The switching controller 110 switches turning-on and turning-off of driving assistance or degrees of driving assistance on the basis of operation signals that are input from predetermined switches (for example, a main switch and an automatic switch) included in the display apparatus 400. The switching controller 110 may switch driving to manual driving by canceling driving assistance on the basis of an operation for giving an instruction for acceleration, deceleration, or steering on the driving operator 80 such as the accelerator pedal, the brake pedal, or the steering wheel.

The display controller 120 displays an image on the display apparatus 400. Details of a function of the display controller 120 will be described later.

[Driving Assistance Controller]

The driving assistance controller 200 executes, for example, the first degree or other driving assistance control. For example, in a case where an ACC is executed, the driving assistance controller 200 controls the traveling drive force output apparatus 500 and the brake apparatus 510 such that the own vehicle M travels in a state in which an intervehicle distance between the own vehicle and a preceding vehicle is constant, on the basis of information that is input from the camera 10, the radar apparatus 12, and the finder 14 via the object recognition apparatus 16. In other words, the driving assistance controller 200 performs acceleration and deceleration control (speed control) based on an intervehicle distance with a preceding vehicle. In a case where an LKAS is executed, the driving assistance controller 200 controls the steering apparatus 520 such that the own vehicle M travels while maintaining a traveling lane on which the own vehicle is currently traveling (lane keeping). In other words, the driving assistance controller 200 performs steering control for maintaining a lane.

[Automated Driving Controller]

The automated driving controller 300 executes, for example, the second degree of driving assistance and the third degree of driving assistance. The automated driving controller 300 includes, for example, a first controller 320 and a second controller 340. The first controller 320 includes, for example, an outside recognizer 321, an own vehicle position recognizer 322, and an action plan generator 323. The outside recognizer 321 recognizes a peripheral situation of the own vehicle M. For example, the outside recognizer 321 recognizes states such as a position, a speed, acceleration, and a traveling lane of a peripheral vehicle (an example of another vehicle) on the basis of information that is input from the camera 10, the radar apparatus 12, and the finder 14 via the object recognition apparatus 16. The position of the peripheral vehicle may be represented by a representative point such as the center or a corner of the peripheral vehicle, and may be represented by a region expressed by a contour of the peripheral vehicle. The "states" of the peripheral vehicle may include acceleration, jerk, or an "action state" (for example, whether or not the vehicle is changing lanes or whether or not the vehicle is trying to change lanes) of the peripheral vehicle.

The outside recognizer 321 may recognize positions of obstacles, guardrails, electric poles, parked vehicles, persons such as pedestrians, or other objects on a road, in addition to a peripheral vehicle.

The own vehicle position recognizer 322 recognizes, for example, a lane (traveling lane) on which the own vehicle M is traveling, and a relative position and a posture of the own vehicle M with respect to the traveling lane. The own vehicle position recognizer 322 recognizes the traveling lane, for example, by comparing a road lane marking pattern (for example, arrangement of a solid line and a dashed line) obtained from the second map information 62 with a road lane marking pattern in the periphery of the own vehicle M recognized from an image captured by the camera 10. The own vehicle position recognizer 322 may recognize a position or a posture of the own vehicle M with respect to the traveling lane.

The action plan generator 323 generates an action plan for the own vehicle M performing automated driving toward a destination or the like. For example, the action plan generator 323 determines events that are to be sequentially executed in automated driving control such that the own vehicle can travel on a recommended lane determined by the recommended lane determiner 61 and can cope with a peripheral situation of the own vehicle M. The events in automated driving include, for example, a constant speed traveling event in which the vehicle travels on the same traveling lane at a constant speed, a low speed following event in which the vehicle follows a preceding vehicle at a low speed (for example, 40 km/h or less), a lane change event of changing traveling lanes of the own vehicle M, an overtaking event of overtaking a preceding vehicle, a merging event of joining the vehicle at a merging point, a branch event in which the own vehicle M travels in a target direction at a road branch point, and an emergency stop event of stopping the own vehicle M in an emergency. During execution of the events, an action for avoidance may be planned on the basis of a peripheral situation (the presence of a peripheral vehicle or a pedestrian, lane narrowing due to roadwork, or the like) of the own vehicle M.

The second controller 340 includes, for example, a traveling controller 342. The traveling controller 342 controls the traveling drive force output apparatus 500, the brake apparatus 510, and the steering apparatus 520 such that the own vehicle M passes along a target path generated by the action plan generator 323 at a scheduled time.

The display apparatus 400 is provided, for example, in front of the driver's seat. The display apparatus 400 is any of various display apparatuses such as a liquid crystal display (LCD) or an organic electroluminescence (EL) display. The display apparatus 400 displays an image output from the display controller 120 which will be described later. The display apparatus 400 functions as an instrument panel displaying instruments such as a speedometer and a tachometer, and may display a periphery image which will be described later in a region other than a region in which the instruments are displayed.

The traveling drive force output apparatus 500 outputs traveling drive force (torque) for traveling of the vehicle to drive wheels. The traveling drive force output apparatus 500 includes, for example, a combination of an internal combustion engine, a motor, and a transmission, and an electronic controller (ECU) controlling the constituents. The brake apparatus 510 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information that is input from the traveling controller 342 or information that is input from the driving operator 80, so that brake torque corresponding to a braking operation is output to each vehicle wheel. The steering apparatus 520 includes, for example, a steering ECU and an electric motor. The steering ECU drives the electric motor on the basis of information that is input from the traveling controller 342 or information that is input from the driving operator 80, so that an orientation of a turning wheel is changed.

[Display Controller]

Figure 2:
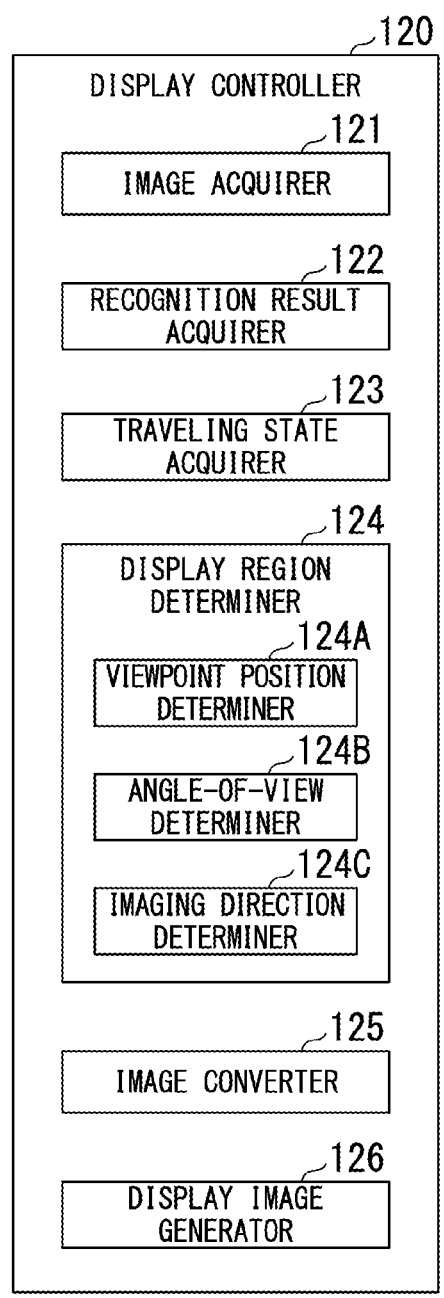
FIG. 2 is a diagram illustrating a functional configuration of a display controller 120.

Next, a description will be made of a configuration example of the display controller 120 of the embodiment. FIG. 2 is a diagram illustrating a functional configuration of the display controller 120. The display controller 120 includes, for example, an image acquirer 121, a recognition result acquirer 122, a traveling state acquirer 123, a display region determiner 124, an image converter 125, and a display image generator 126. The constituent elements are realized, for example, by a hardware processor such as a central processing unit (CPU) executing a program (software). Some or all of the constituent elements may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation.

The image acquirer 121 acquires a captured image of the periphery of the own vehicle M generated by the camera 10.

The recognition result acquirer 122 acquires recognition results such as a position, a speed, acceleration, a traveling lane, and a distance of an object such as another vehicle present in the periphery of the own vehicle M, recognized by the automated driving controller 300. The recognition result acquirer 122 may acquire information such as a road shape or a road lane marking recognized by the automated driving controller 300.

The traveling state acquirer 123 acquires, for example, a traveling state of the own vehicle M detected by the vehicle sensor 70.

In a case where a periphery image (virtual image) indicating a peripheral situation of the own vehicle M is displayed on a display surface of the display apparatus 400, the display region determiner 124 determines a display region of the periphery image on the display surface on the basis of the traveling state acquired by the traveling state acquirer 123. The traveling state includes some or all of, for example, a speed, acceleration, jerk, and an angular speed (yaw rate) about a vertical axis of the own vehicle M. The traveling state may include a traveling environment of the own vehicle M or the degree of driving assistance of the own vehicle M. The traveling state is the current traveling state of the own vehicle M, but may be a future traveling state of the own vehicle M instead thereof (or in addition thereto). The future traveling state is a traveling state of the own vehicle M after a predetermined time (after several seconds or several minutes), predicted on the basis of, for example, the current traveling state or peripheral situation. Details of the function of the display region determiner 124 will be described later.

The image converter 125 converts the captured image acquired by the image acquirer 121 into a virtual image. The image converter 125 converts, for example, original data of a captured image generated from a real viewpoint into data viewed from a virtual viewpoint by using a predefined conversion table. The conversion table is a table in which a coordinate of each pixel of original data is mapped onto a coordinate of each pixel of a virtual image after conversion. Alternatively, a process for conversion into a virtual image may be performed according to a calculation expression.

The image converter 125 may change sizes, shapes, and display positions in a display region of images of the own vehicle M, another vehicle, a road, and an obstacle included in the captured image from the camera 10 on the basis of the display region of the periphery image determined by the display region determiner 124.

The display image generator 126 generates a display image to be displayed on the display surface of the display apparatus 400 on the basis of the image obtained through conversion in the image converter 125. Hereinafter, a description will be made of an example of a process of the display image generator 126 generating a display image.

First, the display image generator 126 recognizes an object included in a captured image obtained through conversion in the image converter 125. The object includes, for example, an own vehicle, another vehicle, a mark (including a lane marking) on a road, an obstacle, and a structure. Recognizing an object involves recognizing, for example, a vehicle type of another vehicle, the type of a lane marking, the type of a symbol drawn on a road, the type of obstacle, and the type of structure. Object recognition may be performed according to a machine learning method such as deep learning. When a plurality of objects are included in a captured image, the display image generator 126 recognizes each object.

The display image generator 126 adds a recognition result in the automated driving controller 300, acquired by the recognition result acquirer 122, to a recognition result based on the captured image. In this case, when the recognition result based on the captured image is different from the recognition result in the automated driving controller 300, the display image generator 126 may select objects on the basis of the reliability of information, and may cause the automated driving controller to learn a selected result.

Next, the display image generator 126 generates an animation image on the basis of the position of the recognized object. More specifically, the display image generator 126 may generate an animation image on the basis of the recognized object, the position of the object, and information (a road shape or the number of lanes), acquired from the navigation apparatus 50, regarding the road on which the own vehicle M is traveling.

The animation image is an image in which objects such as the own vehicle M, other vehicles, road marks, and structures included in a captured image, and the information regarding the road acquired from the navigation apparatus 50 are represented by icons, text, sample images, and polygonal shapes indicating appearances of vehicles and roads. The animation image may include display of a distance to another vehicle, a speed of another vehicle, and the like. The animation image may be a moving image, and may be a still image updated at a predetermined interval. The display image generator 126 may compute and display information such as a speed, acceleration, or a turning angle of the own vehicle M or another vehicle in addition to the animation image.

In a case of lane markings partitioning a road into a plurality of lanes on which traveling in the same direction is possible, the display image generator 126 may generate animation images of different lane markings such that an occupant can visually recognize whether or not a lane change from one lane to another lane is possible. The display image generator 126 may generate different animation images such that an occupant can visually recognize whether or not a lane is an overtaking lane. The display image generator 126 acquires information regarding whether or not a lane change is possible and information regarding whether or not overtaking is possible from the second map information 62.

The display image generator 126 generates an animation image having a region that is supposed in consideration of parameters of an angle of view, a viewpoint, and an imaging direction with an absolute coordinate of an object as a reference. A position of an object in the animation image is computed on the basis of an absolute coordinate. As a result, an absolute positional relationship that is a basis of the animation image does not change before or after a display region of a periphery image is changed by the display region determiner 124. Consequently, the display image generator 126 can generate a display image such that a relative positional relationship between objects does not change before or after a display region is changed.

A display image is generated as described above, and thus a positional relationship between the own vehicle M and an object recognized by the object recognition apparatus 16 changes in accordance with a display region on the basis of a traveling state of the own vehicle M even in a case where the display region of a periphery image is changed. As a result, an occupant can more reliably recognize the relative positional relationship.

[Display Region Determiner]

Next, details of the function of the display region determiner 124 will be described. For example, the display region determiner 124 determines virtual viewpoint parameters such as a viewpoint position of a virtual viewpoint, an angle of view from the virtual viewpoint, and an imaging direction (gazing direction) from the virtual viewpoint on the basis of a traveling state of the own vehicle M, and then determines a display region of a periphery image. In this case, the display region determiner 124 may fix the virtual viewpoint parameters, and may change only a display region of a periphery image on the basis of a traveling state of the own vehicle M. The display region determiner 124 may change a display region on the basis of a future traveling state (for example, future acceleration/deceleration information or a movement direction) of the own vehicle M.

The display region determiner 124 includes, for example, a viewpoint position determiner 124A, an angle-of-view determiner 124B, and an imaging direction determiner 124C. The viewpoint position determiner 124A determines a viewpoint position of a virtual viewpoint. The virtual viewpoint is, for example, an imaging position of a virtual camera in a case where an imaging position of the real camera 10 is set as a real viewpoint. A predetermined correction process (image conversion) may be performed on a captured image generated by the camera 10 such that a captured image generated from a real viewpoint is converted into a virtual image generated from a virtual viewpoint. For example, the viewpoint position determiner 124A determines a viewpoint position of a virtual viewpoint to a position where the own vehicle M is overviewed from above. The viewpoint position determiner 124A may determine a viewpoint position of a virtual viewpoint to a position where the own vehicle M is viewed from behind.

The angle-of-view determiner 124B determines an angle of view from a virtual viewpoint. For example, a virtual image subjected to image correction for increasing an angle of view is wider than an original image. On the other hand, a virtual image subjected to image correction for decreasing an angle of view is narrower than an original image.

The imaging direction determiner 124C determines an imaging direction (a gazing direction or an optical axis direction) of a virtual camera. The imaging direction of the virtual camera may be represented by a solid angle from a virtual viewpoint. The imaging direction may be represented by an azimuth angle in a horizontal direction and a depression angle (or an elevation angle) in a height direction.

Hereinafter, a description will be made of an example in which the display region determiner 124 determines a display region in cases where a virtual viewpoint parameter is fixed and is changed.

[Case where Virtual Viewpoint Parameter is Fixed]

Figure 3:
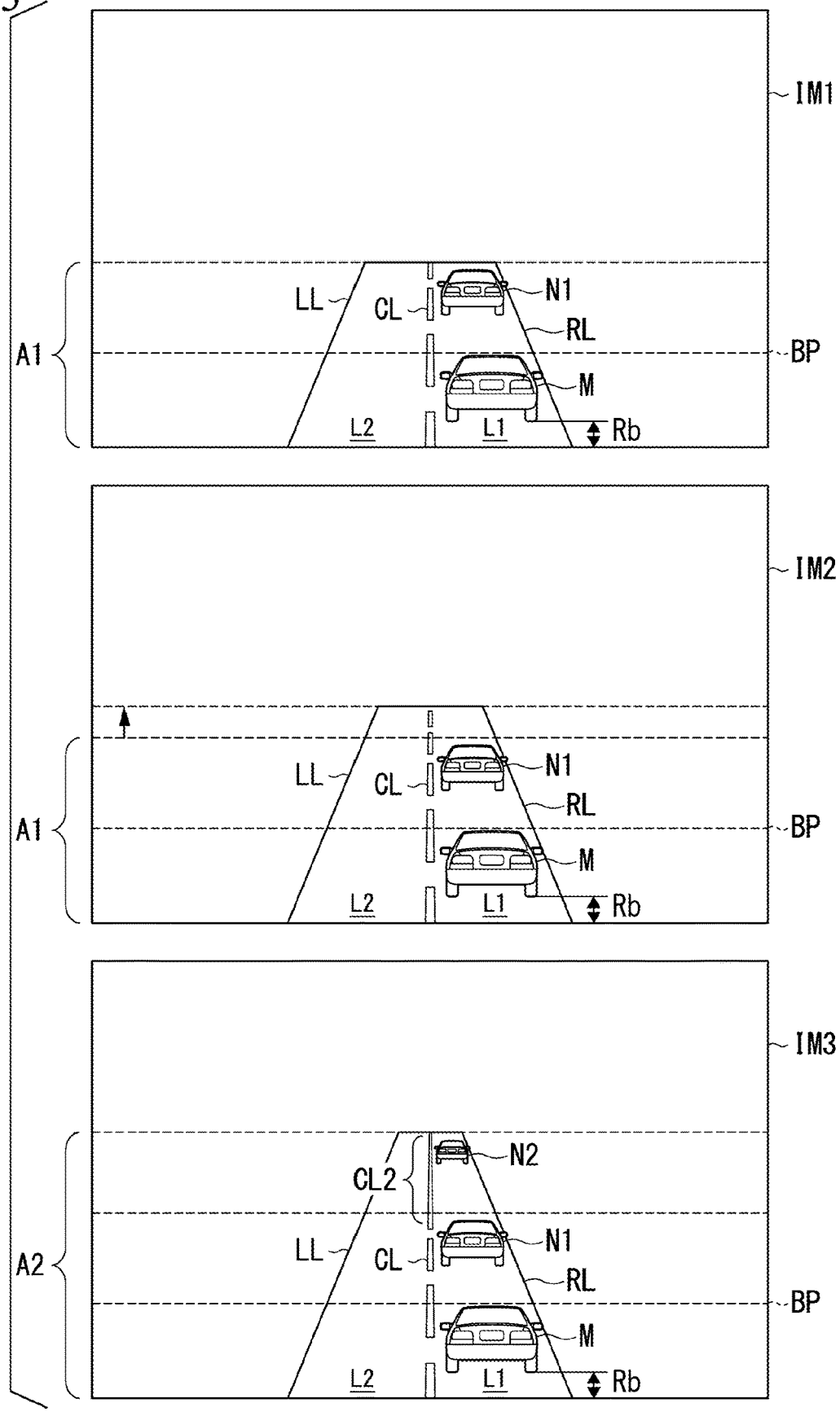
FIG. 3 is a diagram illustrating examples of images IM1 to IM3 obtained by displaying a periphery image in different display regions on a display apparatus in a case where a virtual viewpoint parameter is fixed.

FIG. 3 is a diagram illustrating examples of images IM1 to IM3 obtained by displaying a periphery image in different display regions on the display apparatus in a case where a virtual viewpoint parameter is fixed. FIG. 3 illustrates a scene in which a display region of a periphery image is changed from A1 to A2 according to an increase of a speed of the own vehicle M. In the example illustrated in FIG. 3, of two lanes L1 and L2 on which the own vehicle M can travel in the same direction, the own vehicle is assumed to travel on the lane L1. LL, CL, and RL are animation images of lane markers partitioning a road into the lanes L1 and L2. BP indicates a reference display position of the own vehicle M.

Figure 4:
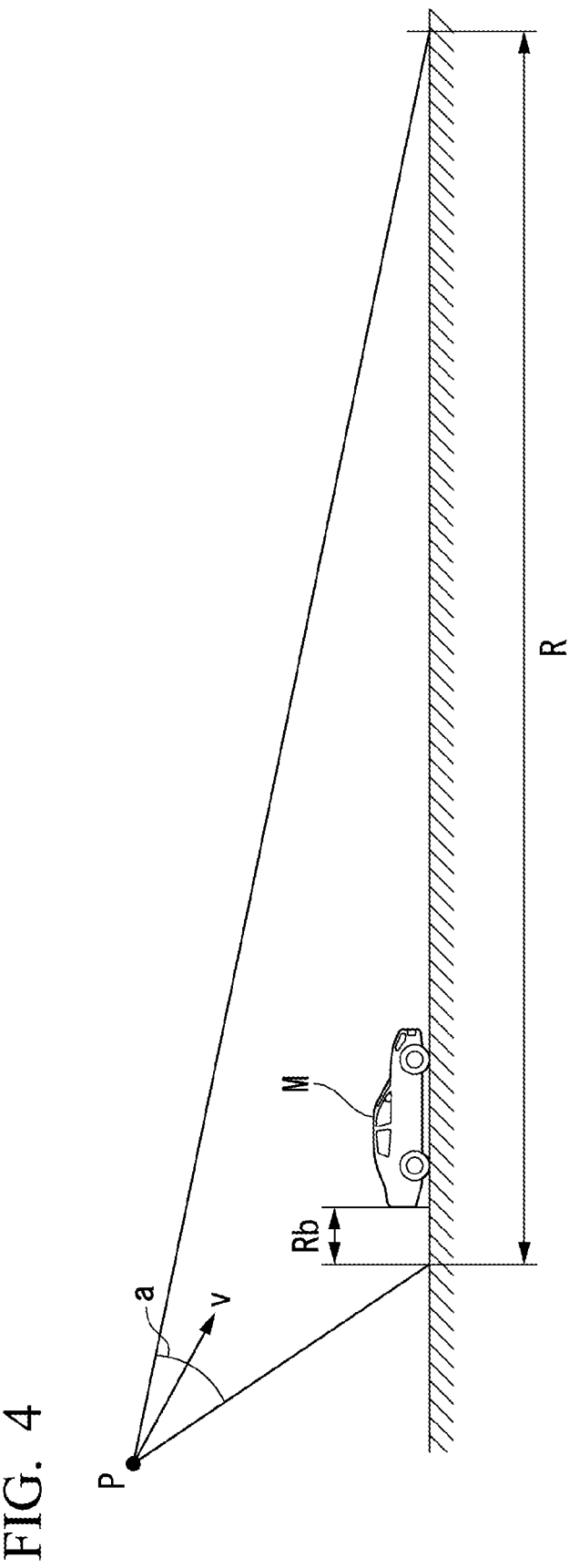
FIG. 4 is a diagram for describing a periphery image region in a case where the virtual viewpoint parameter is fixed.

The display region determiner 124 changes a display region of a periphery image displayed on the display surface in the entire region of the periphery image (hereinafter, referred to as a periphery image region) on the basis of a speed of the own vehicle M. FIG. 4 is a diagram for describing a periphery image region in a case where the virtual viewpoint parameter is fixed. In FIG. 4, P indicates a viewpoint position of a virtual viewpoint, v indicates an imaging direction of a virtual camera, and a indicates an angle of view of the virtual camera. FIG. 4 illustrates a planar outline viewed from a side surface with respect to an advancing direction of the own vehicle M. Actually, the viewpoint position P has a three-dimensional coordinate with respect to the own vehicle M, and the imaging direction v has a three-dimensional vector. In a case where the viewpoint position P, the imaging direction v, and the angle of view a are fixed, the entire periphery image region is represented by R. The periphery image region R is a planar region. Hereinafter, a display region corresponding to the entire periphery image region R is assumed to be A2 illustrated in FIG. 3.

For example, in a case where a speed of the own vehicle M is lower than a first predetermined speed, the display region determiner 124 determines a display region of a periphery image displayed on the display surface to A1 in FIG. 3 in the periphery image region R. The first predetermined speed is, for example, about 40 kph. The display image generator 126 generates the image IM1 including a periphery image having the display region A1, and displays the generated image IM1 on the display surface of the display apparatus 400. Animation images of the own vehicle M and another vehicle N1 included in the display region A1 overlap the display region A1 in the upper part of FIG. 3.

In a case where a speed of the own vehicle M is lower than the first predetermined speed, the display region determiner 124 may fix a display region not to be smaller than the display region A1 regardless of a speed of the own vehicle M. Consequently, it is possible to prevent a display region from being too small and an occupant thus being unable to understand a peripheral scene of the own vehicle M from a periphery image.

In a case where a speed of the own vehicle M is equal to or higher than the first predetermined speed, the display region determiner 124 increases a display region of a periphery image compared with a case where a speed of the own vehicle M is lower than the predetermined speed. Increasing a display region involves increasing the entire display region upwards by changing a position of an upper end of the display region A1 as illustrated in the intermediate part of FIG. 3. In this case, the display region determiner 124 may increase a display region linearly or nonlinearly according to a change of a speed until the speed of the own vehicle M reaches a second predetermined speed higher than the first predetermined speed from a time point at which the speed reaches the first predetermined speed. The second predetermined speed is, for example, about 90 kph.

In a case where a speed of the own vehicle M is equal to or higher than the first predetermined speed and is lower than the second predetermined speed, as illustrated in the intermediate part of FIG. 3, the display image generator 126 displays the image IM2 on the display surface of the display apparatus 400. The image IM2 is wider in a display region in front of the own vehicle M than the image IM1, and, as a result, the lane markings LL, CL, and RL extend away from the own vehicle M from the position displayed in the display region A1. Consequently, a road shape corresponding to a speed of the own vehicle M can be displayed, and thus information required for periphery monitoring can be displayed to an occupant.

In a case where a speed of the own vehicle M is equal to or higher than the second predetermined speed, the display image generator 126 displays the image IM3 as illustrated in the lower part of FIG. 3 on the display surface of the display apparatus 400. An image of still another vehicle N2 overlaps the display region A2 in addition to the own vehicle M and another vehicle N1 in the lower part of FIG. 3.

An image of a dotted lane marking CL indicating that a lane change is possible and an image of a solid lane marking CL2 indicating that a lane change is not possible are displayed between the lanes L1 and L2 in the lower part of FIG. 3. As mentioned above, different lane markings are displayed on the basis of whether or not a lane change is possible on a road on which the own vehicle M is traveling, and thus an occupant can easily understand whether or not the lane change is possible.

On the other hand, in a case where a speed of the own vehicle M is gradually reduced from a state of being equal to or higher than the second predetermined speed, the display region determiner 124 changes a display region from A2 to A1.

As illustrated in FIG. 4, the display region determiner 124 may determine the periphery image region R to include a region (rear region) within a predetermined distance (Rb) from a rear end part of the own vehicle M. Consequently, even in a case where a distant position on the front side of the own vehicle M is widely displayed, the display controller 120 can prevent the rear region of the own vehicle M from being invisible such that a situation behind the own vehicle M can be recognized at all times.

In a case where a display region is changed from A1 to A2, the display region determiner 124 may make the distance Rb from the end part even. Consequently, in a case where a display region is changed to be increased, only a front display region of the own vehicle M is increased. As a result, as illustrated in the image IM1 to the image 3, the reference display position BP of the own vehicle M can be made substantially constant, and thus an occupant can easily understand a relative positional relationship between the own vehicle M and other vehicles.

The display controller 120 may display animation images of instruments such as a speedometer and a tachometer or information indicating the degree of driving assistance of the own vehicle M in the images IM1 to IM3.

As mentioned above, the display controller 120 can appropriately display a periphery image of the own vehicle M from a nearby position to a distant position on the display apparatus 400 on the basis of a traveling state of the own vehicle M. A gazing point of an occupant during traveling at a high speed is farther than during traveling at a low speed, and thus the display controller 120 can perform appropriate display at the gazing point of the occupant.

[Case where Virtual Viewpoint Parameter is Changed]

Next, a description will be made of a case where a virtual viewpoint parameter is changed. For example, when a traveling environment of the own vehicle M or the degree of driving assistance of the own vehicle M changes, the display region determiner 124 changes a virtual viewpoint parameter. The traveling environment is, for example, a road type (for example, a highway or a general road), a road gradient, or a road shape. Changing a virtual viewpoint parameter involves changing at least one of the viewpoint position P of a virtual viewpoint, the imaging direction v from the virtual viewpoint P, and the angle of view a from the virtual viewpoint. A virtual viewpoint parameter is changed, and thus a periphery image region to be a basis for changing a display region is changed depending on a speed.

Figure 5:
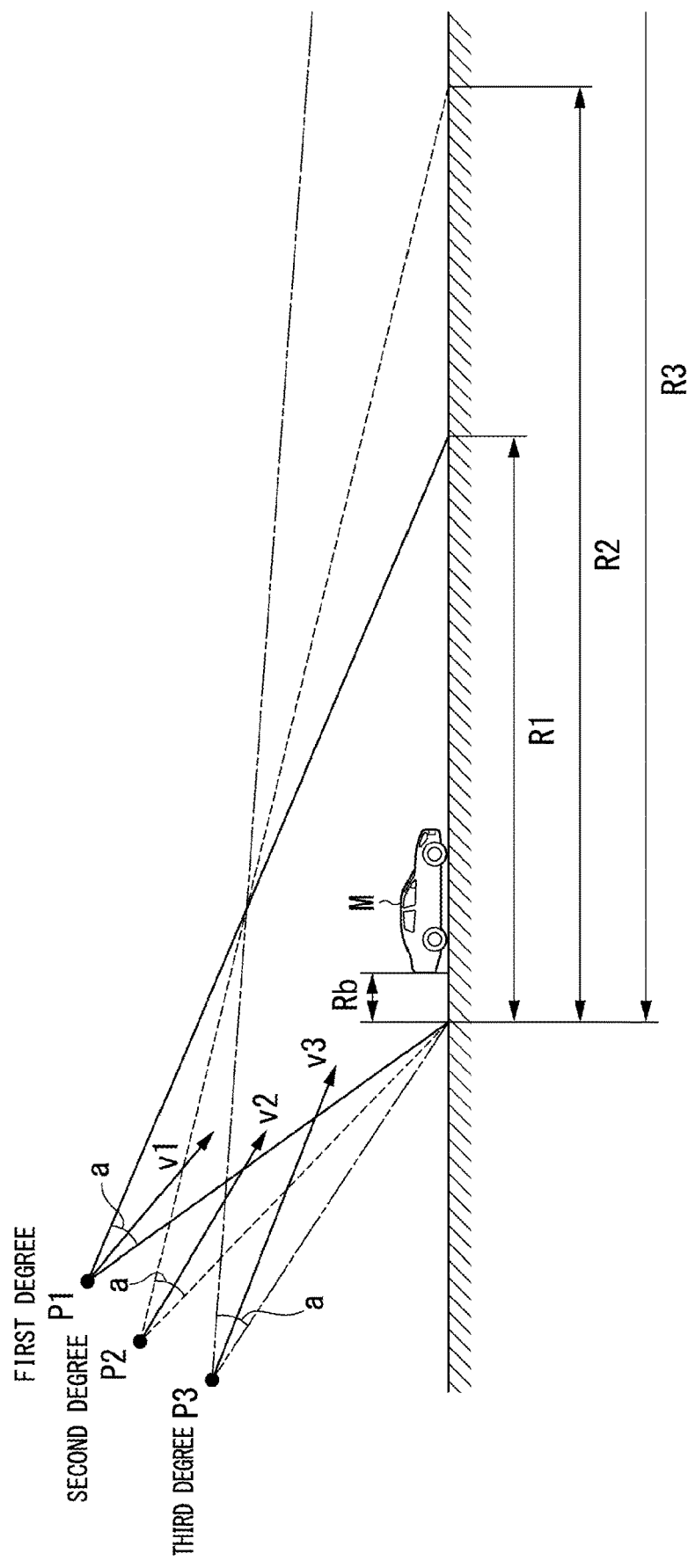
FIG. 5 is a diagram for describing changes of a periphery image region based on the degree of driving assistance.

FIG. 5 is a diagram for describing that a periphery image region is changed on the basis of the degree of driving assistance. In FIG. 5, P1 to P3 indicate viewpoint positions of a virtual viewpoint, and v1 to V3 indicate imaging directions of a virtual camera. Periphery image regions respectively corresponding to the viewpoint positions P1 to P3 are represented by R1 to R3. In the example illustrated in FIG. 5, the angle of view a at the viewpoint positions P1 to P3 is fixed, but may be changed on the basis of the degree of driving assistance.

For example, when the degree of driving assistance of the own vehicle M is changed in an order of the first degree, the second degree, and the third degree, the display region determiner 124 changes a viewpoint position in an order of P1, P2, and P3, and also changes an imaging direction in an order of v1, v2, and v3. As a result, a periphery image region is changed in an order of R1, R2, and R3, to include scenery up to a more distant position on the front side of the own vehicle M. On the other hand, in a case where the degree of driving assistance is changed in an order of the third degree, the second degree, and the first degree, a periphery image region is changed in an order of R3, R2, and R1. Consequently, the end on the front side of own vehicle M in a periphery image region comes closer to the own vehicle M as the degree of driving assistance becomes lower, and is thus narrower than in a case where the degree of driving assistance is higher. As the degree of driving assistance becomes higher, a periphery image region is changed to include scenery up to a more distant position on the front side of the own vehicle M. This allows an occupant to have a margin to driving assistance.

Figure 6:
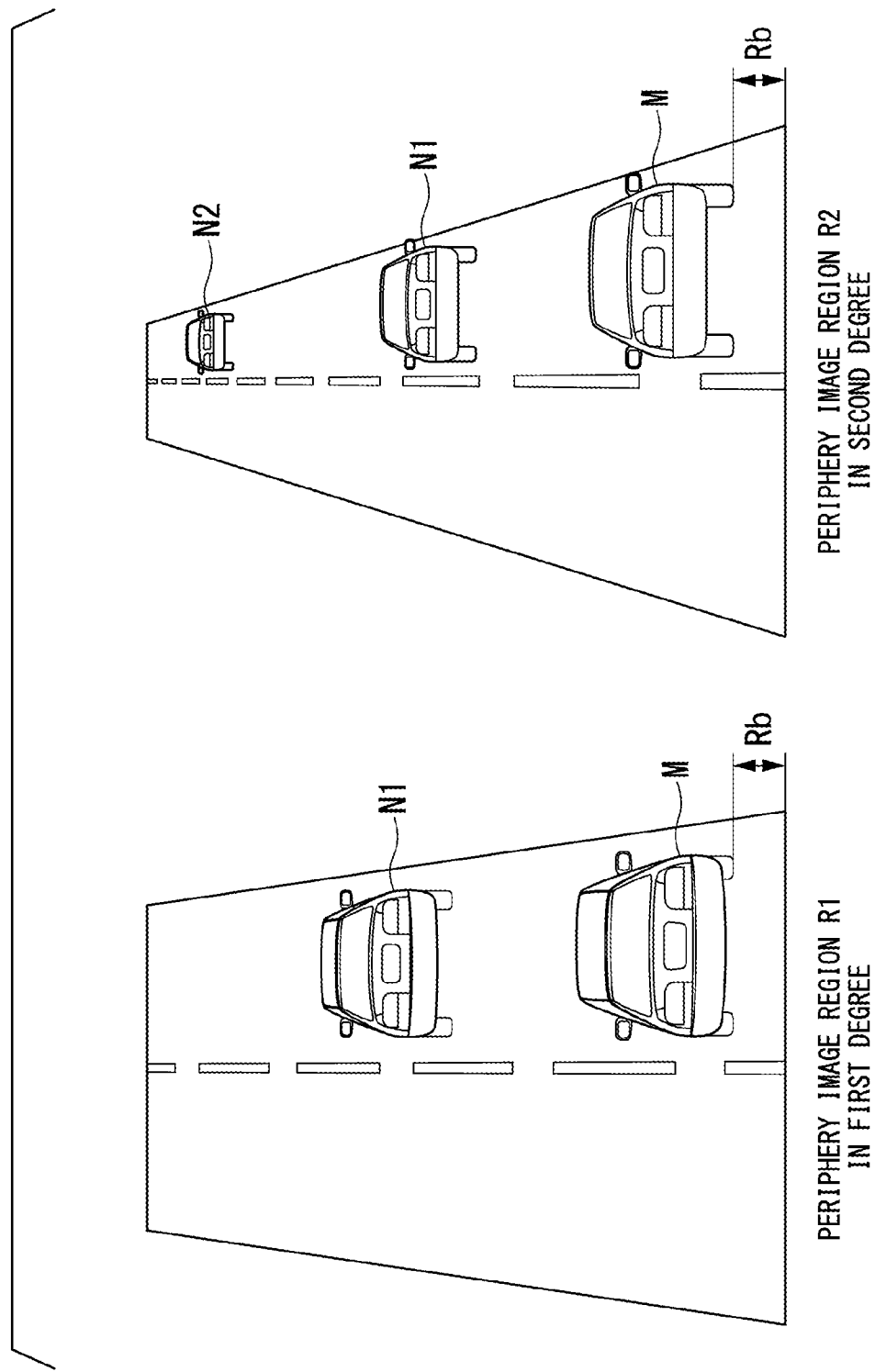
FIG. 6 is a diagram for describing a periphery image region in the degree of driving assistance.

FIG. 6 is a diagram for describing a periphery image region in the degree of driving assistance. In an example illustrated in FIG. 6, periphery image regions in cases where the degree of driving assistance is the first degree and the second degree are illustrated. As illustrated in the left part of FIG. 6, the periphery image region R1 in the first degree can display the periphery of the own vehicle M in detail in a case where the degree of driving assistance is low since a depression angle (an angle with respect to a horizontal direction) from the virtual viewpoint is large. As illustrated in the right part of FIG. 6, the periphery image region R2 in the second degree can display a more distant position on the front side of the own vehicle M during automated driving since a depression angle from the virtual viewpoint is small. The display region determiner 124 changes a display region from A1 to A2 on the basis of a speed of the own vehicle M by using a periphery image region that is obtained according to the degree of driving assistance. In the example illustrated in FIG. 6, since viewpoint positions are different from each other in a case of the periphery image region R1 and in a case of the periphery image region R2, views from vehicles (the own vehicle M and other vehicles) present in the periphery image regions are also different from each other. As illustrated in FIG. 6, the display image generator 126 generates images of vehicles with different views according to a virtual viewpoint parameter such as a viewpoint position, and displays the generated images in a display region.

As mentioned above, by changing a virtual viewpoint parameter according to the degree of driving assistance, determining a periphery image region, and determining a display region based on a speed of the own vehicle M with respect to the determined periphery image region, it is possible to display a more appropriate periphery image.

[Process Flow]

Figure 7:
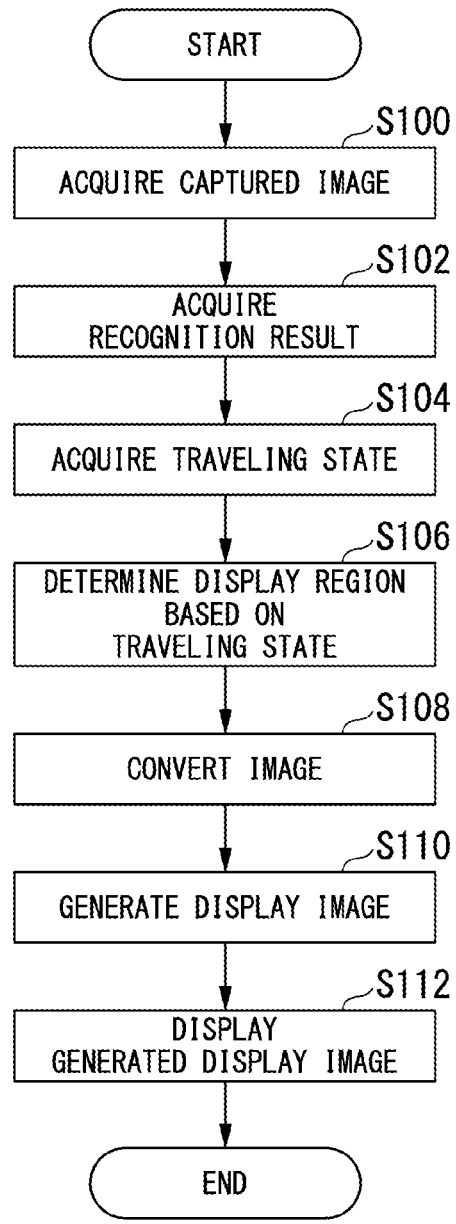
FIG. 7 is a flowchart illustrating an example of a flow of a process executed by the display system of the embodiment.

FIG. 7 is a flowchart illustrating an example of a flow of a process executed by the display system of the embodiment. The process in the flowchart is repeatedly executed, for example, in a predetermined cycle. In the example illustrated in FIG. 7, the image acquirer 121 acquires a captured image of the periphery of an own vehicle generated by the camera 10 (step S100). Next, the recognition result acquirer 122 acquires a recognition result of an object in the periphery of the own vehicle, recognized by the automated driving controller 300 (step S102).

Next, the traveling state acquirer 123 acquires a traveling state of the own vehicle M (step S104). Next, the display region determiner 124 determines a display region of a periphery image on the basis of the traveling state of the own vehicle M (step S106).

Next, the image converter 125 converts the captured image acquired by the image acquirer 121 into a periphery image (step S108). Next, the display image generator 126 generates a display image in the display region of the periphery image obtained through conversion in the process in step S108 on the basis of the display region of the periphery image determined by the display region determiner 124 (step S110), and displays the generated display image on the display surface of the display apparatus 400 (step S112). Consequently, the process in the flowchart is finished.

According to the embodiment described above, the display system includes the display apparatus 400 that displays an image, and the display controller 120 that controls the display apparatus 400 such that a periphery image indicating a peripheral situation of the own vehicle M viewed from a predetermined virtual viewpoint is displayed in a predetermined display region on a display surface, the display controller 120 changing the predetermined display region on the basis of a traveling state of the own vehicle M, and can thus appropriately display the periphery of a vehicle according to a state of the own vehicle M.

[Hardware Configuration]

Figure 8:
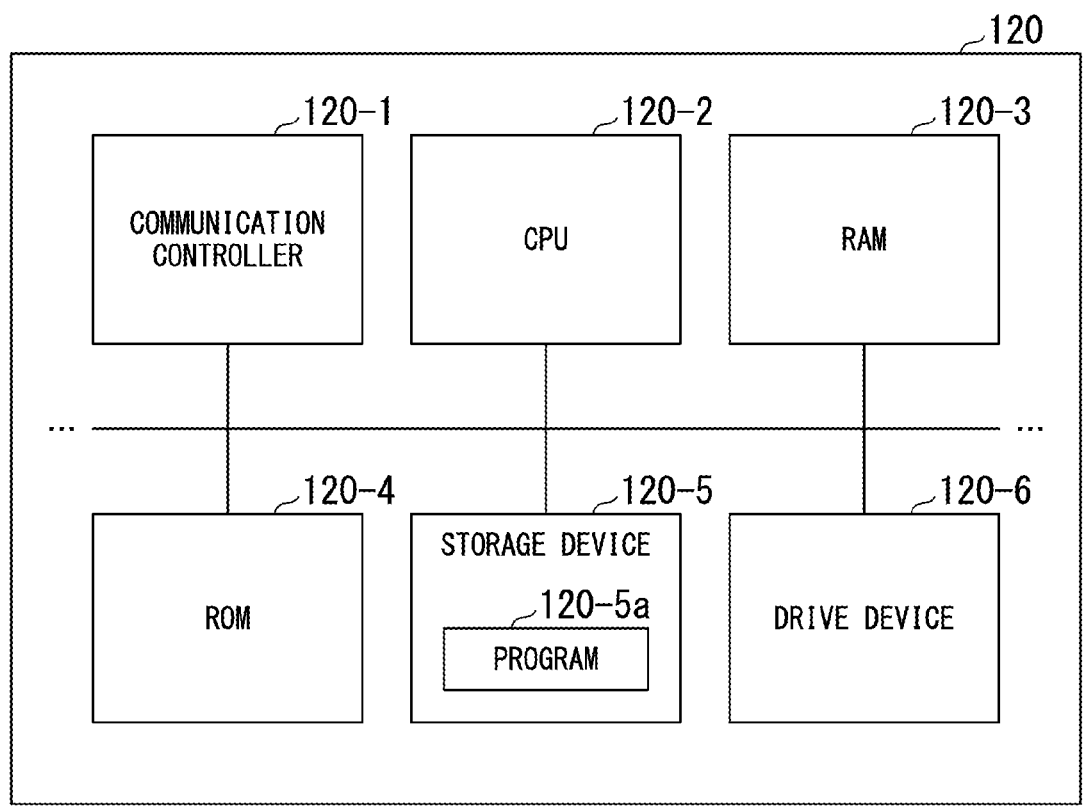
FIG. 8 is a diagram illustrating an example of a hardware configuration of the display controller 120 of the embodiment.

The display controller 120 of the display system of the embodiment is implemented by a hardware configuration as illustrated in FIG. 8, for example. FIG. 8 is a diagram illustrating an example of a hardware configuration of the display controller 120 of the embodiment.

The display controller 120 is configured to include a communication controller 120-1, a CPU 120-2, a RAM 120-3, a ROM 120-4, a secondary storage device 120-5 such as a flash memory or an HDD, and a drive device 120-6 that are connected to each other via an internal bus or a dedicated communication line. A portable storage medium such as an optical disc is attached to the drive device 120-6. A program 120-5a stored in the secondary storage device 120-5 is loaded onto the RAM 120-3 by a DMA controller (not illustrated) and is executed by the CPU 120-2 such that the functional constituents of the display controller 120 are realized. A program referred to by the CPU 120-2 may be stored in a portable storage medium attached to the drive device 120-6, and may be downloaded from another device via a network NW.

The embodiment may be expressed as follows.

A display system includes a storage device and a hardware processor that executes a program stored in the storage device, in which the hardware processor is configured to execute the program to control a display such that a periphery image indicating a peripheral situation of an own vehicle viewed from a predetermined virtual viewpoint is displayed in a predetermined display region on a display surface, and to change the predetermined display region on the basis of a traveling state of the own vehicle.

As mentioned above, the mode for carrying out the present invention has been described by using the embodiment, but the present invention is not limited to the embodiment, and various modifications and replacements may occur within the scope without departing from the spirit of the present invention.

REFERENCE SIGNS LIST

1 Vehicle system
10 Camera
12 Radar apparatus
14 Finder
16 Object recognition apparatus
20 Communication apparatus
50 Navigation apparatus
60 MPU
70 Vehicle sensor
80 Driving operator
100 Master controller
110 Switching controller
120 Display controller
121 Image acquirer
122 Recognition result acquirer
123 Traveling state acquirer
124 Display region determiner
124A Viewpoint position determiner
124B Angle-of-view determiner
124C Imaging direction determiner
125 Image converter
126 Display image generator
200 Driving assistance controller
300 Automated driving controller
320 First controller
340 Second controller
400 Display apparatus
500 Traveling drive force output apparatus
510 Brake apparatus
520 Steering apparatus
M Own vehicle

What is claim is:

1. A display system comprising:
a processor;
a memory storing program instructions executable by the processor to:
display an image;
control a display such that a periphery image indicating a peripheral situation of a vehicle viewed from a predetermined virtual viewpoint is displayed in a predetermined display region on a display surface, and change the predetermined display region when a speed of the vehicle is equal or higher than a predetermined speed on a basis of a traveling state of the vehicle; and
execute driving assistance of the vehicle to a plurality of different degrees,
wherein changing the predetermined display region comprises widening a display range in a forward direction of the vehicle from a current display range and changing a shape of a road on which the vehicle is traveling and lane markings partitioning the road to extend in a far direction of the vehicle, the shape of the road and the lane markings being displayed in a widened display region,
wherein changing the predetermined display comprises determining an angle of view from the virtual viewpoint on a basis of an environment of a road on which the vehicle is traveling and the degree of driving assistance controlled, and changes the predetermined display region on a basis of the determined angle of view.

2. The display system according to claim 1,
wherein changing the predetermined display comprises increasing the predetermined display region in a case where the speed of the vehicle is equal to or higher than the predetermined speed compared with a case where the speed of the vehicle is lower than the predetermined speed.

3. The display system according to claim 2,
wherein changing the predetermined display comprises fixing the predetermined display region in a case where the speed of the vehicle is lower than the predetermined speed.

4. The display system according to claim 1, wherein the program instructions are further executable by the processor to:
recognize an object present in the periphery image of the vehicle,
wherein controlling the display comprises a display controller displaying an image of an object recognized in the predetermined display region.

5. The display system according to claim 1,
wherein changing the predetermined display comprises displaying a rear region and a front region of the vehicle in the predetermined display region, and changes a display region regarding the front region in the predetermined display region on a basis of the traveling state of the vehicle.

6. The display system according to claim 1,
wherein changing the predetermined display comprises changing a position of an upper end of the predetermined display region on a basis of the traveling state of the vehicle.

7. A display method causing a computer to:
control a display such that a periphery image indicating a peripheral situation of a vehicle viewed from a predetermined virtual viewpoint is displayed in a predetermined display region on a display surface;
change the predetermined display region when a speed of the vehicle is equal or higher than a predetermined speed on a basis of a traveling state of the vehicle;
execute driving assistance of the vehicle to a plurality of different degrees,
wherein changing the predetermined display region comprises widening a display range in a forward direction of the vehicle from a current display range and changing a shape of a road on which the vehicle is traveling and lane markings partitioning the road to extend in a far direction of the vehicle, the shape of the road and the lane markings being displayed in a widened display region,
wherein changing the predetermined display comprises determining an angle of view from the virtual viewpoint on a basis of an environment of a road on which the vehicle is traveling and the degree of driving assistance controlled, and changes the predetermined display region on a basis of the determined angle of view.

8. A non-transitory computer-readable storage medium that stores a program to be executed by a computer to perform at least:
controlling a display such that a periphery image indicating a peripheral situation of a vehicle viewed from a predetermined virtual viewpoint is displayed in a predetermined display region on a display surface;
changing the predetermined display region when a speed of the vehicle is equal or higher than a predetermined speed on a basis of a traveling state of the vehicle; and
executing driving assistance of the vehicle to a plurality of different degrees,
wherein changing the predetermined display region comprises widening a display range in a forward direction of the vehicle from a current display range and changing a shape of a road on which the vehicle is traveling and lane markings partitioning the road to extend in a far direction of the vehicle, the shape of the road and the lane markings being displayed in a widened display region, wherein changing the predetermined display comprises determining an angle of view from the virtual viewpoint on a basis of an environment of a road on which the vehicle is traveling and the degree of driving assistance controlled, and changes the predetermined display region on a basis of the determined angle of view.

\* \* \* \* \*